US008135598B2

(12) United States Patent
Brown et al.

(10) Patent No.: US 8,135,598 B2
(45) Date of Patent: Mar. 13, 2012

(54) SYSTEMS AND METHODS FOR PROVIDING A DEFERRED ANNUITY WITH A TARGET DATE RETIREMENT BENEFIT

(75) Inventors: Adam Michael Brown, Maple Grove, MN (US); Daniel Robert Slater, Minnetrista, MN (US)

(73) Assignee: Allianz Life Insurance Company of North America, Minneapolis, MN (US)

( * ) Notice: Subject to any disclaimer, the term of this patent is extended or adjusted under 35 U.S.C. 154(b) by 438 days.

(21) Appl. No.: 12/259,954

(22) Filed: Oct. 28, 2008

(65) Prior Publication Data

US 2010/0106532 A1    Apr. 29, 2010

(51) Int. Cl.
G06Q 40/00    (2012.01)
(52) U.S. Cl. .......................................................... 705/4
(58) Field of Classification Search ........................ 705/4
See application file for complete search history.

(56) References Cited

U.S. PATENT DOCUMENTS

| 6,611,808 | B1 * | 8/2003 | Preti et al. ........................... 705/4 |
| 7,149,713 | B2 * | 12/2006 | Bove et al. ................... 705/36 R |
| 7,606,751 | B2 * | 10/2009 | Tarbox et al. .................... 705/35 |
| 7,831,494 | B2 * | 11/2010 | Sloan et al. .................. 705/36 R |
| 2003/0120570 | A1 * | 6/2003 | Dellinger et al. ................ 705/35 |
| 2006/0206398 | A1 * | 9/2006 | Coughlin .......................... 705/35 |
| 2007/0100715 | A1 * | 5/2007 | O'Donnell et al. .............. 705/35 |
| 2008/0071661 | A1 * | 3/2008 | Jeudy et al. .................. 705/36 R |
| 2009/0164385 | A1 * | 6/2009 | Frain et al. ................... 705/36 R |
| 2009/0307016 | A1 * | 12/2009 | Gray et al. ......................... 705/4 |
| 2010/0030584 | A1 * | 2/2010 | Guilbert et al. .................... 705/4 |
| 2010/0280971 | A1 * | 11/2010 | Haskins et al. ............. 705/36 R |

OTHER PUBLICATIONS

Byrd Financial Group, Annuity Strategies, Guaranteed Minimum Accumulation Benefit (GMAB), Wayback Machine, Jun. 7, 2007, www.annuity-strategies.com, p. 1.*
Byrd Financial Group, Annuity Strategies, Type of Annuities, Wayback Machine, Jun. 7, 2007, www.annuity-strategies.com, p. 1-3.*
Byrd Financial Group, Annuity Strategies Wayback Machine, Jun. 7, 2007, www.annuity-strategies.com, p. 1-9.*
Midland National Life Insurance Company: Prospectus—Flexible Premium Deferred Variable Annuity, May 1, 2004, pp. 1-132.*
MoneyGuidePro: Portfolio Optimizer, 2002-2006, pp. 1-9.*
Considine, G.: Fixing Target Date Strategies: Target Date Folios, Mar. 25, 2008, FOLIOfn Investments, Inc., pp. 1-8.*
Palmer, Bruce A.:Equity-Indexed Annuities: Fundamental Concept and Issues, Oct. 2006, Insurance Information Institute, pp. 1-64.*

* cited by examiner

*Primary Examiner* — Bijendra K Shrestha
(74) *Attorney, Agent, or Firm* — Wong, Cabello, Lutsch, Rutherford & Brucculeri LLP (57) ABSTRACT

Systems and methods for guaranteeing a Target Value of an account on any given Target Value Date. The investment profile of the account may be automatically adjusted to be more or less conservative based on the evolution of the contract with respect to its accumulation value and guarantee. Within broadly defined groups of allocation choices the owner has complete freedom to distribute the account value to individual choices within those groups. The risk profile of the investments may be contracted to change as the Target Value Date approaches.

29 Claims, 4 Drawing Sheets

Table of Allocation Percentages to the Fixed Allocation

| Year | 7 | 8 | 9 | 10 | 11 | 12 | 13 | 14 | 15 | 16 | 17 | 18 | 19 | 20 |
|---|---|---|---|---|---|---|---|---|---|---|---|---|---|---|
| 1 | 20.00% | 19.50% | 19.00% | 18.50% | 18.00% | 17.50% | 17.00% | 16.50% | 16.00% | 15.50% | 15.25% | 15.00% | 14.75% | 14.50% |
| 2 | 20.00% | 19.50% | 19.00% | 18.50% | 23.50% | 22.75% | 22.00% | 21.25% | 16.00% | 20.00% | 19.50% | 19.25% | 18.75% | 14.50% |
| 3 | 30.00% | 28.00% | 26.50% | 26.25% | 29.25% | 28.00% | 26.75% | 25.75% | 21.75% | 24.50% | 24.00% | 23.25% | 22.75% | 19.00% |
| 4 | 40.00% | 36.75% | 34.25% | 34.00% | 34.75% | 33.25% | 31.75% | 30.50% | 27.25% | 29.00% | 28.25% | 27.50% | 26.50% | 23.75% |
| 5 | 50.00% | 45.25% | 41.75% | 41.75% | 40.50% | 38.50% | 36.75% | 35.00% | 33.00% | 33.75% | 32.50% | 31.50% | 30.50% | 28.25% |
| 6 | 60.00% | 53.75% | 49.25% | 49.75% | 46.00% | 43.75% | 41.50% | 39.75% | 38.50% | 38.25% | 36.75% | 35.75% | 34.50% | 32.75% |
| 7 | 70.00% | 62.50% | 56.75% | 57.50% | 51.50% | 48.75% | 46.50% | 44.50% | 44.25% | 42.75% | 41.25% | 39.75% | 38.50% | 37.25% |
| 8 | | 71.00% | 64.50% | 65.25% | 57.25% | 54.00% | 51.50% | 49.00% | 49.75% | 47.25% | 45.50% | 43.75% | 42.50% | 42.00% |
| 9 | | | 72.00% | 73.00% | 62.75% | 59.25% | 56.25% | 53.75% | 55.50% | 51.75% | 49.75% | 48.00% | 46.50% | 46.50% |
| 10 | | | | 72.00% | 68.50% | 64.50% | 61.25% | 58.50% | 61.00% | 56.25% | 54.00% | 52.25% | 50.25% | 51.00% |
| 11 | | | | | 74.00% | 69.75% | 66.25% | 63.00% | 66.75% | 60.75% | 58.50% | 56.25% | 54.25% | 55.50% |
| 12 | | | | | | 75.00% | 71.00% | 67.75% | 72.25% | 65.50% | 62.75% | 60.50% | 58.25% | 60.25% |
| 13 | | | | | | | 76.00% | 72.25% | 79.00% | 70.00% | 67.00% | 64.50% | 62.25% | 64.75% |
| 14 | | | | | | | | 77.00% | 78.00% | 74.50% | 71.25% | 68.75% | 66.25% | 69.25% |
| 15 | | | | | | | | | 78.00% | 79.00% | 75.75% | 72.75% | 70.25% | 73.75% |
| 16 | | | | | | | | | | 79.00% | 80.00% | 77.00% | 74.00% | 78.50% |
| 17 | | | | | | | | | | | 80.00% | 81.00% | 78.00% | 83.00% |
| 18 | | | | | | | | | | | | 81.00% | 82.00% | 83.00% |
| 19 | | | | | | | | | | | | | 82.00% | 83.00% |
| 20 | | | | | | | | | | | | | | 83.00% |

Table 2

FIG. 4

SYSTEMS AND METHODS FOR PROVIDING A DEFERRED ANNUITY WITH A TARGET DATE RETIREMENT BENEFIT

FIELD OF THE INVENTION

The invention disclosed herein relates generally to the field of annuity contracts, and more particularly to systems and methods for managing an investment product that correlates a guaranteed income target amount at a specified date to an investment strategy. The strategy includes, inter alia, balancing predicted performance of underlying investments with amount of time to target date.

BACKGROUND OF THE INVENTION

An annuity is a close financial cousin to a life insurance contract and pays periodic income benefits for a specific period of time or over the course of a lifetime. Life insurance companies offer annuities. There are two basic types of annuities: deferred and immediate. Deferred annuities allow assets to grow over time before being converted to income payments. Immediate annuities begin payments immediately, or within a year of purchase.

An annuity may be fixed or variable. The U.S. Securities and Exchange Commission typically does not regulate fixed annuities, but it does regulate variable annuities. In a fixed annuity, all assets underlying the annuity are held in the insurer's general account, with the insurer bearing the investment risk. In a variable annuity, all assets underlying the annuity are held in a separate account and the annuity owner bears the investment risk, directly participating in the gains and losses of those assets, net of any fees. These separate account assets are composed of assets in specified investment subaccounts provided within the annuities. These investment subaccounts are not publicly traded.

Many deferred annuities allow annuity owners to deposit additional money, possibly restricted to periods of time or to maximums or minimums.

A guaranteed minimum accumulation benefit (GMAB) provides that at a predetermined point in time during the accumulation period, the accumulation value will be no less than a predetermined value. A GMAB might guarantee that after 10 years the accumulation value is no less than 100% of purchase payments. Thus, after 10 years, if cumulative investment performance has been negative, the accumulation value would automatically be increased such that the accumulation value is equal to 100% of purchase payments.

SUMMARY OF THE INVENTION

The present invention relates to annuity products that are designed to guarantee a fixed benefit at a future date, for instance a retirement date, based on an initial investment into an annuity contract where the annuity holder is required to follow investment guidelines set by the annuity issuer. In its simplest form the present invention can be used to provide a guaranteed amount or Target Value at a Target Value Date in the future, i.e. at retirement, but can also provide for possible upside if the investment choices made by the account holder cause the account value to exceed the guaranteed target benefit. In this instance the account holder is protected from any downside, while enjoying any upside benefits, again assuming the account holder stays within the investment guidelines set out by the annuity issuer.

To support the guarantee the present invention discloses a blended investment guideline structure that adjusts investments from more aggressive and growth-oriented to more stable and conservative over time. It permits or applies a higher ratio of indexed or variable investments to fixed investments initially, and as the target date approaches, it permits or applies a lower ratio of indexed or variable investments to fixed investments. As discussed in more detail below, the present invention provides an annuity product that offers a guaranteed return at a target date selected by an account holder, assuming the account holder follows the investment guidelines set by the annuity issuer.

BRIEF DESCRIPTION OF THE DRAWINGS

FIG. 4 illustrates a table (Table 2) of allocation percentages to Fixed Allocation according to one disclosed embodiment.

DETAILED DESCRIPTION

The present invention provides an annuity product with a Target Date Benefit at a predetermined date called the Target Value Date. The Target Value Date can be a chosen contract anniversary date which, in at least one embodiment, is at least seven years after issue. The predetermined value of the annuity at the Target Value Date is called the Target Value, which could be, for example, total premiums paid, premiums grown at a predetermined amount, a high water account value, or other quantity. In one embodiment of the present invention (Target Date Retirement), the Target Value is set to be equal to the purchase payments received at issue. After the issue date, the account holder may direct the investments in the annuity account within guidelines set out in the annuity contract. Periodically, between issue and the Target Value Date, if the account value (the actual value of the account holder's investment choices) exceeds the Target Value, the Target Value will be increased to match the account value. In the first embodiment, the Target Value is compared with the account value annually at the anniversary of the issue date and increased to equal the account value if it does not already exceed the account value. Finally, on the Target Value Date, if the account value is less than the Target Value, the annuity issuer will credit the account an amount sufficient to increase the account value to match the Target Value.

In another embodiment, on each anniversary after the initial Target Value Date the account holder can choose to restart with a new Target Value Date, at least as far out as the minimum time required by contract. By contract, a new Target Value will be set for the new Target Value Date. At the new Target Value Date, the same comparisons discussed above will occur. That is, if the account value exceeds the Target Value, the Target Value is increased to match the account value; or on the Target Value Date if the Target Value exceeds the account value, the account value is increased to match the Target Value.

In the example of Table 1 below, the Target Value Date is chosen to be the seventh anniversary of the issue date. The Target Value is compared to the account or accumulation value at each anniversary. If the account or accumulation value on an anniversary date is more than the Target Value, the Target Value is reset to the account value. The Target Value is initially set to equal the purchase payments of $100,000 and in the example, increases to incorporate positive market performance on the second, fifth, and sixth anniversaries. On the seventh anniversary, the Target Value Date, the annuity issuer pays $6,000 into the contract holder's account to raise the accumulation value from $106,000 to the guaranteed Target Value of $112,000. In the present invention, once a Target Value Date is reached the contract holder may select a new Target Value Date. In one embodiment, as shown in the example of Table 1, the contract renews annually with the new Target Value Date being the next anniversary.

TABLE 1

| Anniversary | Accumulation Value | Target Value |
| --- | --- | --- |
| Issue | 100,000 | 100,000 |
| 1 | 99,000 | 100,000 |
| 2 | 109,000 | 109,000 |
| 3 | 105,000 | 109,000 |
| 4 | 101,000 | 109,000 |
| 5 | 111,000 | 111,000 |
| 6 | 112,000 | 112,000 |
| 7 | 106,000 | 112,000 |
| Post credit | 112,000 | |
| 8 | 117,000 | 117,000 |
| 9 | 119,000 | 119,000 |
| 10 | 115,000 | 119,000 |
| Post credit | 119,000 | |

In the example shown in Table 1, on the eighth and ninth anniversaries the Target Value increases to incorporate positive market performance and the Target Value Date is then advanced one year. The tenth anniversary is another Target Value Date and the insurance company pays $4,000 into the contract holder's account to raise the accumulation value from $115,000 to the guaranteed Target Value of $119,000.

The present invention provides for defined investment choices that can be made by the contract owner after the issue date. Within broadly defined groups of allocation choices the owner has complete freedom to distribute the account value to individual choices within those groups. With respect to requiring an increasingly conservative distribution of the contract's account value, the company imposes required maximums to groups of choices, but not to individual choices. The client is free to distribute the account value to a given group, and to the extent the permitted maximum changes, the company may re-distribute that account value to accommodate the permitted maximum. In one embodiment the present invention requires that the client distribute at least some account value to an allocation choice in the most conservative group.

The Target Date Benefit of the present invention provides additional benefits. In contrast to other products which may require a 5, 7 or 10 year wait between lock-in and access, the present invention allows, on any Target Value Date, the contract owner to select a walk-away value or cash surrender value of a maximum anniversary value locked in as recently as one year in the past (less withdrawal charge). Therefore, the contract owner may choose to accept the maximum anniversary value and simply be charged the withdrawal charge. Typically, for an annuity contract the withdrawal charge declines over time to zero.

The present invention provides for automatically adjusting the investment profile of the account to be more or less conservative based on the evolution of the contract with respect to its account value and guarantee. An aggressive owner will likely distribute account value to allocation choices with an eye to participating in the upside potential of market returns. Alternatively an owner may conservatively distribute account value to allocation choices, such that the changing conservatism that may be demanded by the contract may not come into play. The timing of, and degree to which, the company's adjustments occur is entirely transparent. For example, if the contract calls for 50% aggressive and 50% conservative, the restriction will not come into play for a client who is already 60% conservative. However, a client who wants to be 80% aggressive and 20% conservative will see the invention change the distribution to 50% aggressive and 50% conservative. The method is presented at contract issue, and an interested owner can verify the contract's behavior against the company's disclosure.

The present invention can also be used with a prescribed schedule of fixed and indexed investments where greater or accelerated returns can be offered as a Target Date Benefit. In this instance, the owner gives up some flexibility for a guarantee which is simpler and relatively more robust. At the Target Date, the Target Accelerator provides for a higher Target Value in return for the owner's reduced investment flexibility. Under this design, there are two principle ways in which the owner's flexibility is comparatively more limited.

First, there are only two allocation choices, each in its own group. The two allocation choices are a fixed account and an indexed account. The fixed account provides a guaranteed interest rate, which in one embodiment can be established at issue and unchanged for the duration of the Target Period, and not less than 3%. The indexed account may provide choices based on market-index performance and in one embodiment, a guaranteed minimum return not less than zero.

Second, the exact distribution, rather than the permitted maximally aggressive allocation, of account value between the indexed account and the fixed account is prescribed for each time period. The distribution schedule differs according to the Target Date. Earlier in the Target Period, the present invention in one embodiment provides an allocation that allows a higher percentage of the contract assets to be allocated to the indexed investment rather than fixed. As the Target Date approaches, the allocation then shifts to a higher percentage of fixed account. The reallocation of percentages can happen periodically, for instance at each anniversary date or quarterly. As discussed before, the Target Value is considered periodically and can be adjusted up to the account value to incorporate positive investment performance. As with the Target Date Benefit, the schedule of allocations is completely transparent to the owner.

Figure 1:
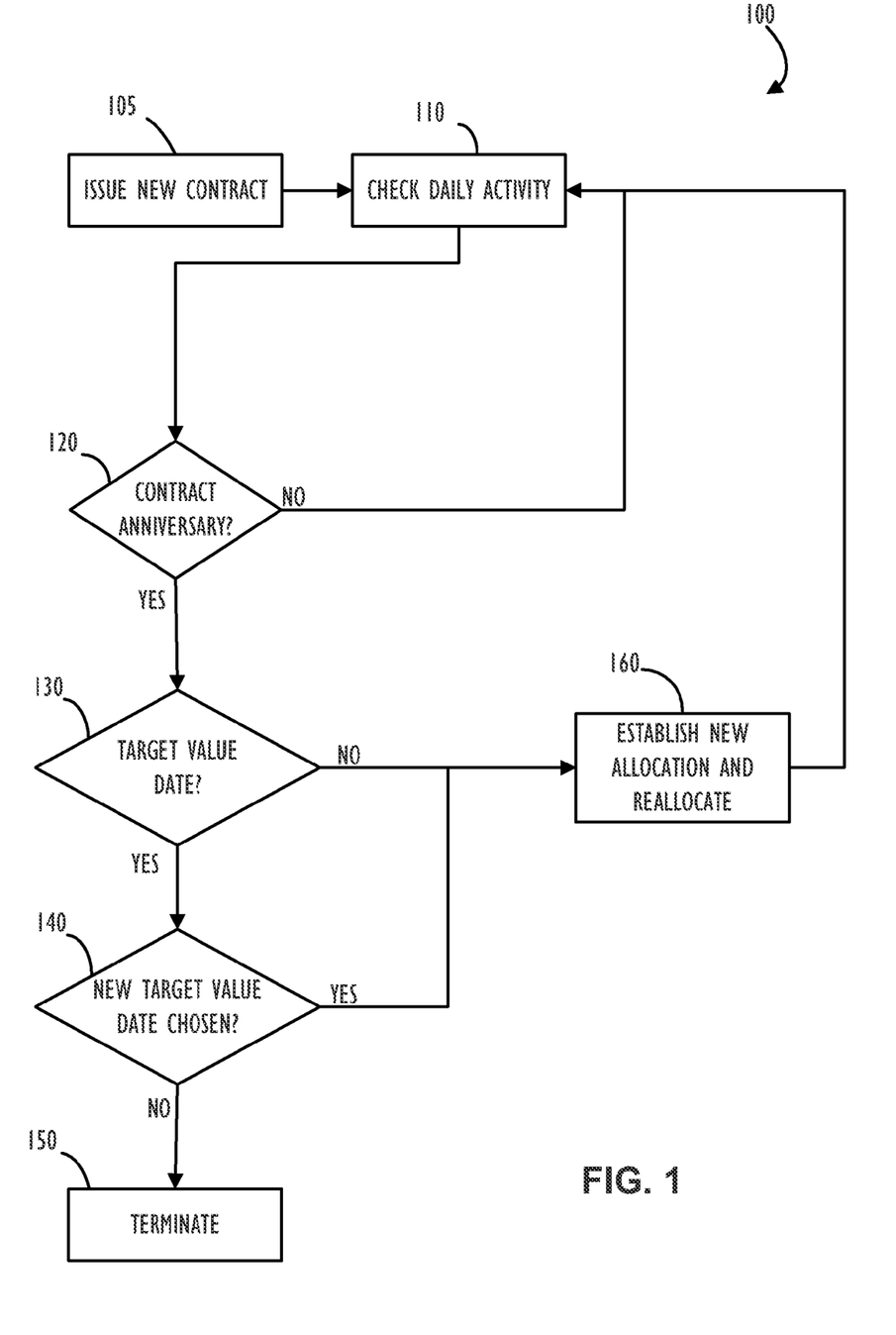
FIG. 1 shows, in flowchart form, a "Target Accelerator" embodiment of the invention.

In FIG. 1, the present invention in the form of the Target Accelerator (process 100) is described in broad terms. It assumes that prescribed rebalances occur annually, although the current invention can accommodate periods of any length. At step 105, the annuity issuer issues the annuity contract to the contract owner and the initial allocation between fixed and indexed pursuant to the contract requirements and the investments is made. At step 110, each day the account is checked for any activity that has occurred in connection with the annuity contract. The contract is then checked at step 120 to determine if a contract anniversary date has been reached. If not, the process just returns to step 110 to check again for activity the next day. If it is a contract anniversary date, at step 130 the date is checked to see if the Target Value Date has been reached. In the embodiment shown in FIG. 1, the reallocation for different investment blends happens at the anniversary dates. So if it is not a Target Value Date, at step 160, the investments are reallocated based on the guidelines for the next year and the contract owners' compliant selections and the flow is returned to check for daily activity again. If a Target Date has been reached, at step 140, it is determined whether the contract owner and annuity issuer have agreed to extend to a new Target Date, if so, the allocation is reset at step 160 and the system returns to checking for daily activity. If no new Target Date is set, the contract terminates at step 150 and the annuity issuer pays the Target Value less any withdrawal charge. As will be apparent, all of these steps can be performed by a specially programmed computer.

Figure 2:
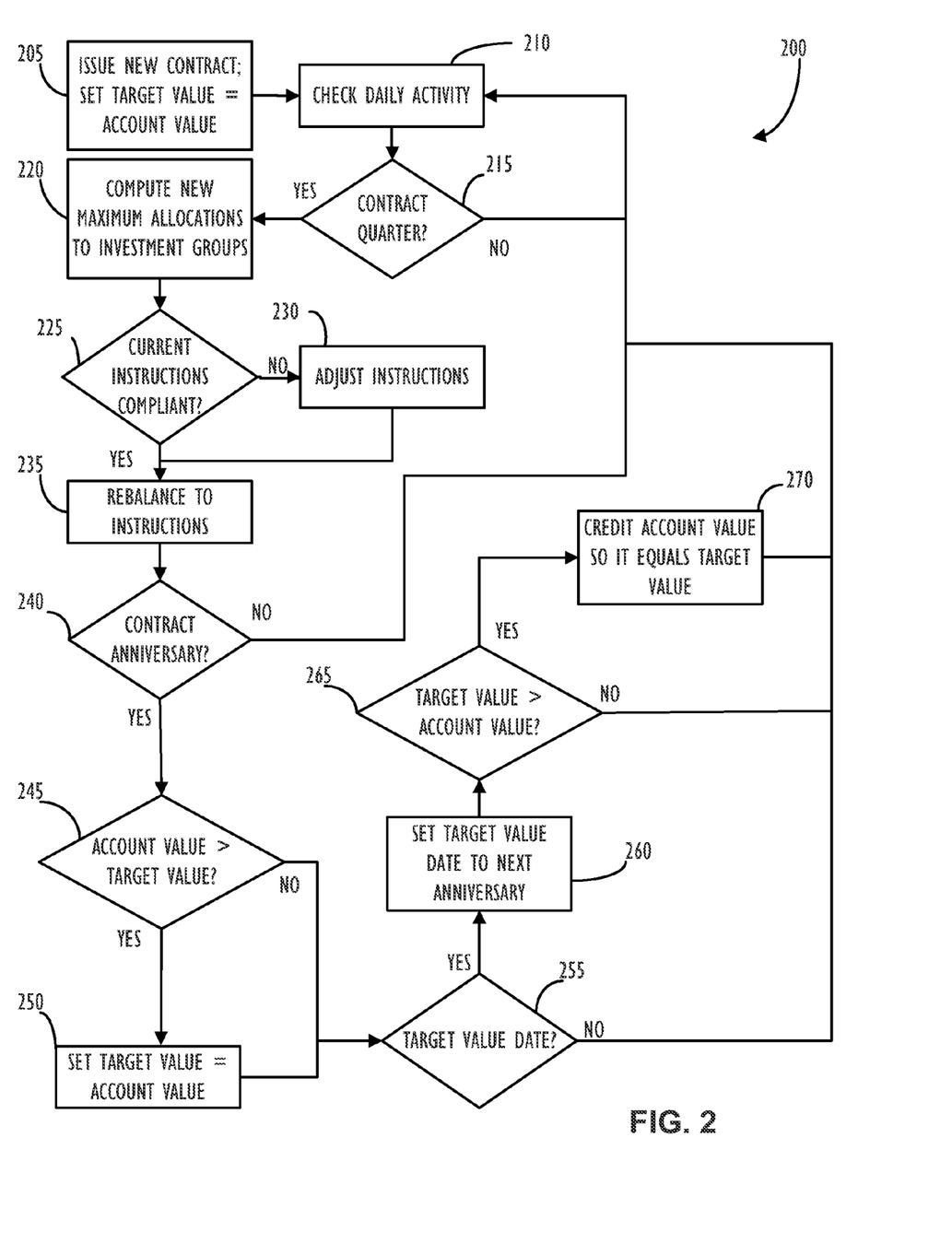
FIG. 2 shows, in flowchart form, a "Target Date Retirement" embodiment of the invention.

FIG. 2 gives a more detailed flow of an embodiment of the present invention (process 200) where the reallocations can occur quarterly, but the Target Value is reset only at the contract anniversary date if the account value exceeds the Target Value. At step 205 the new annuity contract is issued to the contract owner and the Target Value is set equal to the contract value. At step 210, like in FIG. 1, the daily activity is checked. The date is then checked at step 215 to determine whether a contract quarter has been reached. If not, the process returns to checking for daily activity at step 210. If it is a calendar quarter, at step 220 new allocation limits are computed based on the contract terms. At step 225, the current instructions for investments submitted by the contract owner are checked to ensure they remain compliant with the new investment allocations (e.g., between fixed and indexed). If they are non-compliant, at step 230 the instructions are either automatically adjusted or the contract owner is contacted to request new compliant instructions. If the current instructions are compliant or new instructions are provided, the account is rebalanced if necessary based on the instructions at step 235. The date is then checked to determine whether it is a contract anniversary date, at step 240. If not, processing is returned to check daily activity at step 210. If it is a contract anniversary date, in this embodiment, the contract or account value is checked against the Target Value. If the contract or account value is higher than the Target Value, reflecting positive investment performance, the Target Value is adjusted to the contract or account value, at step 250. At this point, or if the Target Value was higher than the account or contract value, the date is checked to determine if the Target Value Date has been reached, at step 255. If not, the system returns to checking for daily account activity, at step 210. If the Target Value Date has been reached, and in this embodiment the contract provides for setting a new Target Value Date one year out, the new Target Value Date is set, at step 260. Because a Target Value Date has been reached, the contract or account value is checked, at step 265, and if the contract or account value is below the guaranteed Target Value, the annuity issuer credits the contract account the difference so that the account value equals the Target Value, at step 270. At that point a new Target Value Date is set and a final Target Value is set based on the previous term. The system then returns to checking for daily activity at step 210 with a new Target Value Date and new Target Value.

Additionally note that the Target Value Date is established as part of contract issuance (step 205). The Target Value Date can be changed on any anniversary and this is called a reset. In one embodiment, the reset is conditional on a) the contract meets or exceeds the Target Value and b) the new Target Value Date is at least seven years in the future. Point (a) is intended to prevent a contract holder from, upon a reset, forfeiting a guarantee. Point (b) amounts to making the inforce contract, just reset, equivalent to a newly-issued contract with the same contract value. Upon a reset the allocation restrictions are thereafter just as they would be on a newly issued contract with the same Target Date.

The present invention offers more benefits to annuity contract holders. Firstly, on any Target Value Date the product offers a walk-away value of a maximum anniversary value locked in as recently as one year in the past (less withdrawal charge). Once the withdrawal charge schedule has expired, this is a particularly powerful guarantee. Secondly, the investment profile of the account value may be automatically adjusted to be more and more conservative based on the evolution of the contract with respect to its account value and guarantee. An owner may conservatively distribute account value to allocation choices, in which case the increasing conservatism demanded by the contract may not come into play. More likely an owner will distribute account value to allocation choices with an eye to participating in the upside potential of market returns. The timing of, and degree to which, the company's adjustments occur is entirely transparent. The method is presented at contract issue, and an interested owner can verify the contract's behavior against the company's disclosure. The method requires two tabular look-ups and minimal arithmetic and is simple as well as transparent. Thirdly, within broadly defined groups of allocation choices the owner has complete freedom to distribute account value to individual choices within those groups. With respect to requiring an increasingly conservative distribution of the contract's account value, the company imposes required maximums to groups of choices, but not to individual choices. The client is free to distribute account value to a given group, and to the extent the permitted maximum changes, the company may re-distribute that account value to accommodate the permitted maximum. The company may require that the client distribute at least some account value to an allocation choice in the most conservative group.

Note that the embodiment shown in process 100 of FIG. 1 can be seen as a simplification of the embodiment shown in process 200 of FIG. 2. By comparison the owner gives up some flexibility for a guarantee which is simpler and relatively more robust. There are two principle ways in which the owner's flexibility is comparatively more limited. Firstly, process 100 has only two allocation choices, each in its own group. The two allocation choices are a fixed account and an indexed account. The fixed account provides a guaranteed interest rate, established at issue and unchanged for the duration of the Target Period, and never less than 3%. The indexed account provides returns based on market-index performance and a guaranteed minimum return never less than zero. Secondly, process 100 prescribes the exact distribution of account value between the indexed account and the fixed account for each year in the Target Period. The distribution schedule differs according to the Target Date. As with the Target Date Retirement benefit the scheduled of distributions is completely transparent to the owner.

The guarantee provided by process 100 of FIG. 1 is comparatively more robust. The Target Value at issue is larger than simply purchase payments because, at issue, guaranteed minimum returns are known for guaranteed future distributions of accumulation value. The implicit return over the Target Period is a blend of guaranteed returns over all years' scheduled distributions to fixed and indexed allocation choices. Process 100's guarantee is simpler than process 200's and doesn't lock in maximum anniversary values as it simply guarantees a positive return. It can therefore be seen that process 100 incorporates some of the features outlined above with respect to process 200. By imposing prescriptions rather than maximums, and by simplifying the universe of allocation choices, the contract provider is able to convert the Target Date Benefit into process 100 which has more robust guarantees. These two embodiments of the invention are representative of a spectrum of products which balance guarantees with choices.

One embodiment of the present invention is a Fixed Index Annuity (FIA) with an allocation schedule that allows exposure to the index market while providing a guaranteed rate of return. This particular FIA has growth guarantees, but offers additional upside potential. This allocation schedule provides an optimized, stable expected value to the contract holder on their chosen Target Date. This allocation design is similar to target-date mutual funds and life cycle funds.

Figure 3:
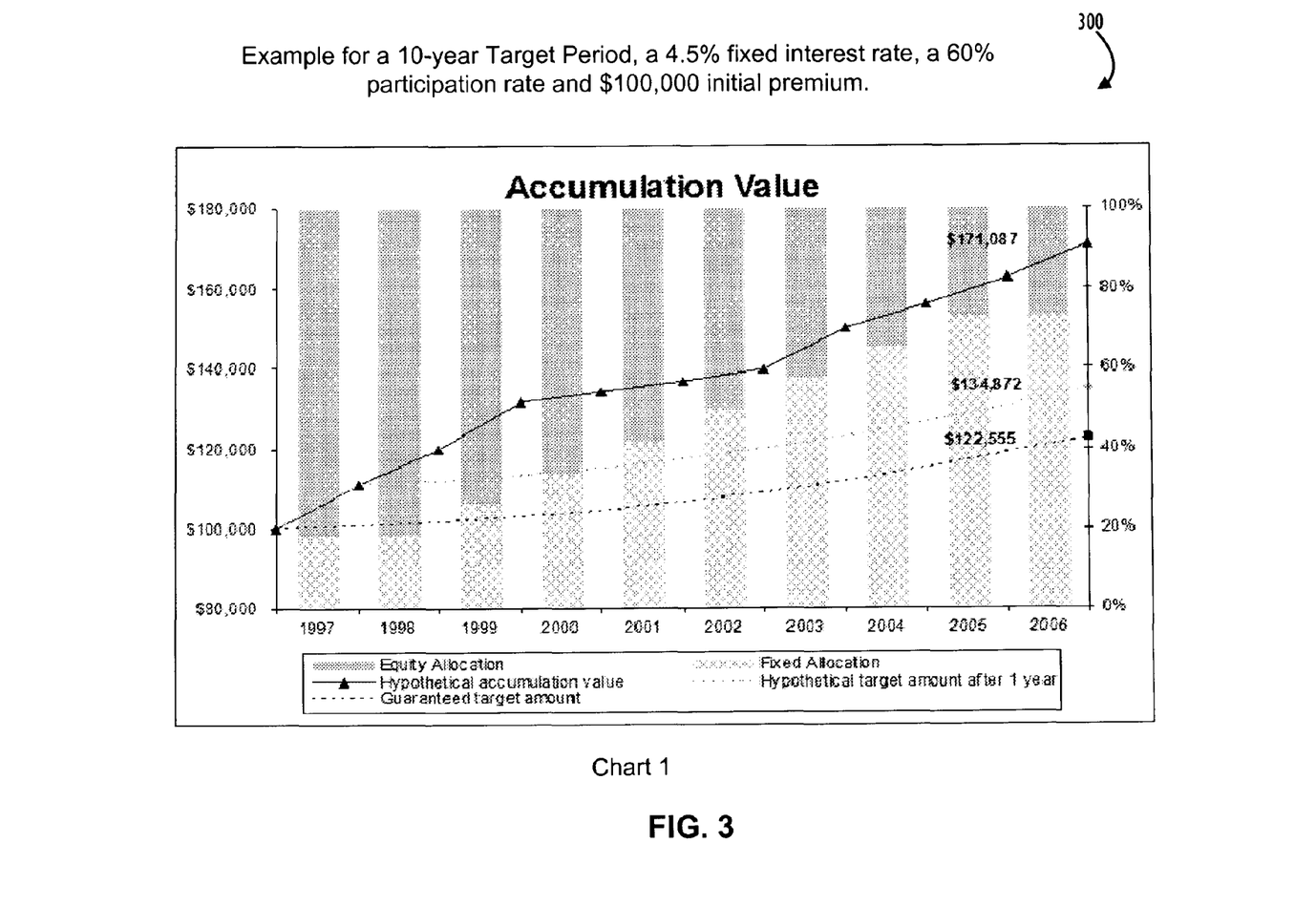
FIG. 3 illustrates a chart (Chart 1) of an example 10 year Target Period according to one disclosed embodiment.

In the first embodiment, the FIA is based on a "Target Period" that the contract holder selects at issue (ranging, for instance, from 7 to 20 years). Each Target Period has an allocation schedule established and automatically implemented by the annuity insurer, as shown by way of example in Chart 1 (300 of FIG. 3) and Table 2 (400 of FIG. 4). The allocation schedule maximizes index growth exposure early on, and then ensures greater guaranteed or fixed growth as the Target Value Date approaches.

programmable gate array ("FPGAs"). Storage devices, sometimes called computer readable medium, suitable for tangibly embodying program instructions include, but are not limited to: magnetic disks (fixed, floppy, and removable) and tape; optical media such as CD-ROMs and digital video disks ("DVDs"); and semiconductor memory devices such as Electrically Programmable Read-Only Memory ("EPROM"), Electrically Erasable Programmable Read-Only Memory ("EEPROM"), Programmable Gate Arrays and flash devices.

It is to be understood that the above description is intended to be illustrative, and not restrictive. For example, the above-described embodiments may be used in combination with each other. Many other embodiments will be apparent to

CHART 2

Table of Allocation Percentages to the Fixed Allocation

Target Guarantee Period

| | | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|
| Year | 1 | 20.00% | 19.50% | 19.00% | 18.50% | 18.00% | 17.50% | 17.00% | 16.50% | 16.00% | 15.50% | 15.25% | 15.00% | 14.75% | 14.50% |
| | 2 | 20.00% | 19.50% | 19.00% | 18.50% | 23.50% | 22.75% | 22.00% | 21.25% | 16.00% | 20.00% | 19.50% | 19.25% | 18.75% | 14.50% |
| | 3 | 30.00% | 28.00% | 26.50% | 26.25% | 29.25% | 28.00% | 26.75% | 25.75% | 21.75% | 24.50% | 24.00% | 23.25% | 22.75% | 19.00% |
| | 4 | 40.00% | 36.75% | 34.25% | 34.00% | 34.75% | 33.25% | 31.75% | 30.50% | 27.25% | 29.00% | 28.25% | 27.50% | 26.50% | 23.75% |
| | 5 | 50.00% | 45.25% | 41.75% | 41.75% | 40.50% | 38.50% | 36.75% | 35.00% | 33.00% | 33.75% | 32.50% | 31.50% | 30.50% | 28.25% |
| | 6 | 60.00% | 53.75% | 49.25% | 49.75% | 46.00% | 43.75% | 41.50% | 39.75% | 38.50% | 38.25% | 36.75% | 35.75% | 34.50% | 32.75% |
| | 7 | 70.00% | 62.50% | 56.75% | 57.50% | 51.50% | 48.75% | 46.50% | 44.50% | 44.25% | 42.75% | 41.25% | 39.75% | 38.50% | 37.25% |
| | 8 | | 71.00% | 64.50% | 65.25% | 57.25% | 54.00% | 51.50% | 49.00% | 49.75% | 47.25% | 45.50% | 43.75% | 42.50% | 42.00% |
| | 9 | | | 72.00% | 73.00% | 62.75% | 59.25% | 56.25% | 53.75% | 55.50% | 51.75% | 49.75% | 48.00% | 46.50% | 46.50% |
| | 10 | | | | 73.00% | 68.50% | 64.50% | 61.25% | 58.50% | 61.00% | 56.25% | 54.00% | 52.25% | 50.25% | 51.00% |
| | 11 | | | | | 74.00% | 69.75% | 66.25% | 63.00% | 66.75% | 60.75% | 58.50% | 56.25% | 54.25% | 55.50% |
| | 12 | | | | | | 75.00% | 71.00% | 67.75% | 72.25% | 65.50% | 62.75% | 60.50% | 58.25% | 60.25% |
| | 13 | | | | | | | 76.00% | 72.25% | 78.00% | 70.00% | 67.00% | 64.50% | 62.25% | 64.75% |
| | 14 | | | | | | | | 77.00% | 78.00% | 74.50% | 71.25% | 68.75% | 66.25% | 69.25% |
| | 15 | | | | | | | | | 78.00% | 79.00% | 75.75% | 72.75% | 70.25% | 73.75% |
| | 16 | | | | | | | | | | 79.00% | 80.00% | 77.00% | 74.00% | 78.50% |
| | 17 | | | | | | | | | | | 80.00% | 81.00% | 78.00% | 83.00% |
| | 18 | | | | | | | | | | | | 81.00% | 82.00% | 83.00% |
| | 19 | | | | | | | | | | | | | 82.00% | 83.00% |
| | 20 | | | | | | | | | | | | | | 83.00% |

In one embodiment, the allocation schedules enable contract holders to pick a Target Period that is most in line with their investment goals. The allocation schedules and the resulting "guaranteed target amount" or Target Value will ensure that lapsing after the 10th year within a 15 year schedule is less advantageous than lapsing after the 10th year in the 10 year schedule. This makes the contract holder's behavior predictable and allows the annuity issuer to invest in longer duration investments.

Various changes in the details of the illustrated operational methods are possible without departing from the scope of the following claims. For instance, illustrative flow chart steps of FIG. 1 and may perform the identified steps in an order different form that disclosed here. Alternatively, some embodiments may combine the activities described herein as being separate steps. Similarly, one or more of the described steps may be omitted, depending upon the specific operational environment the method is being implemented in. In addition, acts in accordance with FIG. 1 or FIG. 2 may be performed by a programmable control device executing instructions organized into one or more program modules. A programmable control device may be a single computer processor, a special purpose processor (e.g., a digital signal processor, "DSP"), a plurality of processors coupled by a communications link or a custom designed state machine. Custom designed state machines may be embodied in a hardware device such as an integrated circuit including, but not limited to, application specific integrated circuits ("ASICs") or field those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

What is claimed is:

1. A computer system configured to manage an annuity product, the computer system comprising:
   a processor; and
   a memory communicatively coupled to the processor, wherein the processor is configured to maintain an annuity product, the annuity product comprising a guarantee, from an insurer to an insured, of a first Target Value at a first Target Value Date,
   wherein the first Target Value is:
      based at least in part on an initial investment into a contract account where account holder is required to follow investment guidelines of the insurer,
      adjusted upward by the insurer if the contract account value exceeds the first Target Value at a predetermined date prior to the first Target Value Date, and
      guaranteed to be greater than the sum of investment payments into the contract account by the first Target Value Date; and
   wherein the first Target Value Date is selected by the insured at contract issuance, wherein periodically, at predetermined dates prior to the first Target Value Date, the contract account value will be increased, by a credit to the contract account by the insurer, to match the first Target Value if the current contract account value is less than the first Target Value, and wherein insured can select, when the first Target Value Date is reached, a second Target Value on a selected future anniversary of the first Target Value Date, the second Target Value is guaranteed by the insurer to be greater than the greater of the first Target Value or the contract account value on the first Target Value Date.

2. The computer system of claim 1 wherein the predetermined date is an anniversary date or a quarterly date.

3. The computer system of claim 1 wherein a blended investment guideline structure adjusts investments with respect to ratio of non-fixed interest investments versus fixed interest investments as a next Target Value Date approaches.

4. The computer system of claim 1 wherein the contract is terminated if the account holder does not follow the investment guidelines.

5. The computer system of claim 1 wherein the contract account is automatically reallocated to follow the investment guidelines.

6. The computer system of claim 1 wherein the guarantee increases for Target Value Dates of greater amount of time in future.

7. The computer system of claim 1 wherein the Target Value and account value are compared and matched annually.

8. The computer system of claim 1 wherein the account holder can choose to continue the guarantee with a new Target Value after receiving the credit to the contract account by the insurer.

9. The computer system of claim 1 wherein the contract automatically renews annually with the second Target Value Date being the next anniversary.

10. A computer system configured to manage an annuity product, the computer system comprising:
- a processor; and
- a memory communicatively coupled to the processor, wherein the processor is configured to maintain an annuity product, the annuity product comprising a guarantee, from insurer to insured, of Target Value, for an account, at a first Target Value Date wherein Target Value is:
  - based on an initial account value and its returns being invested for duration of the guarantee in broadly defined groups of allocation choices, the choices determined by the insurer,
  - adjusted upward by the insurer if the account value exceeds the Target Value at a predetermined date prior to the first Target Value Date, and guaranteed to be greater than sum of investment payments into the account; and
- wherein periodically, at predetermined dates prior to the first Target Value Date, the account value will be increased, by a credit to the account by the insurer, to match the Target Value if the current contract account value is less than the Target Value, and
- wherein the insured has complete freedom to distribute portions of account value to individual choices within the broadly defined groups, and
- wherein the insured can select, when the first Target Value Date is reached, a second Target Value on a selected future anniversary of the first Target Value Date, the second Target Value is guaranteed by the insurer to be greater than the greater of the first Target Value or the account value on the first Target Value Date.

11. The computer system of claim 10 wherein a company issuing the annuity product imposes required maximums to groups of choices.

12. The computer system of claim 10 wherein the insured is able to select a walk-away value of a maximum anniversary value locked in as recently as one year previously.

13. The computer system of claim 10 wherein any applicable withdrawal charges decline over time.

14. The computer system of claim 10 wherein the insured must select one allocation choice from most conservative group of the defined groups of allocation choices.

15. The computer system of claim 10 wherein investment profile of the account value is automatically adjusted based on evolution of the account with respect to the account's accumulation value and guarantee terms.

16. The computer system of claim 10 wherein a higher Target Value is guaranteed to the insured in return for the insured's reduced investment flexibility, the reduced investment flexibility limiting allocation choices available to the insured for distributing portions of account value.

17. The computer system of claim 16 wherein a contract associated with the guarantee prescribes the distribution of accumulation between a non-fixed interest account and a fixed interest account for given time periods.

18. The computer system of claim 10 wherein an allocation choice is available that allows a higher percentage of the account assets to be allocated to non-fixed interest investments rather than fixed interest investments for defined time periods earlier in a Target Period, the Target Period being from date of guarantee to Target Value Date.

19. The computer system of claim 18 wherein the allocation shifts from non-fixed interest investments to fixed interest investments for defined time periods later in the Target Period.

20. A computer system comprising a processing unit wherein the processing unit is configured to:
- receive a first Target Value Date from an insured;
- receive information regarding initial investment by insured into an account;
- determine a guarantee, from an insurer to the insured, of a first Target value at a first Target Value Date;
  - wherein the first Target Value is:
    - based at least in part on an initial investment into a contract account where account holder is required to follow investment guidelines provided by the insurer,
    - adjusted upward by the insurer if the contract account value exceeds the first Target Value at a predetermined date prior to the first Target Value Date, and guaranteed to be greater than sum of investment payments into the contract account by the first Target Value Date; and
- wherein periodically, at predetermined dates prior to the first Target Value Date, the contract account value is identified to be increased, by a credit to the contract account by the insurer, to match the first Target Value if the current contract account value is less than the first Target Value;
- receive a second Target Value for a selected future anniversary of the first Target Value Date, wherein the computer system will only except the second Target Value once the first Target Value Date is reached, and the second Target Value is an amount guaranteed by the insurer to be greater than the greater of the first Target Value or the contract account value on the first Target Value Date; and
- output information required to provide the guarantee.

21. The computer system of claim 20 wherein the act of the determining the guarantee by the processor comprises calculating the guarantee.

22. The computer system of claim 20 wherein the act of the determining the guarantee by the processor comprises obtaining information about an existing guarantee.

23. A computer system comprising a processing unit wherein the processing unit is configured to:
- receive a first Target Value Date from an insured;
- receive information regarding initial investment by insured into an account;
- calculate a guarantee, from insurer to insured, of Target Value, for the account, at the first Target Value Date wherein Target Value is:
  - based on an initial account value and its returns being invested for duration of the guarantee in broadly defined groups of allocation choices, the choices determined by the insurer, wherein the owner has complete freedom to distribute portions of account value to individual choices within the broadly defined groups,
  - adjusted upward by the insurer if the account value exceeds the Target Value at a predetermined date prior to the first Target Value Date, and
  - guaranteed to be greater than sum of investment payments into the account; and
- wherein periodically, at predetermined dates prior to the first Target Value Date, the account value is identified to be increased, by a credit to the account by the insurer, to match the Target Value if the current contract account value is less than the Target Value;
- receive a second Target Value for a selected future anniversary of the first Target Value Date, wherein the computer system will only except the second Target Value once the first Target Value Date is reached, and the second Target Value is an amount guaranteed by the insurer to be greater than the greater of the first Target Value or the account value on the first Target Value Date; and
- output information required to provide the guarantee.

24. The computer system of claim 23 where the processing unit is further configured to automatically adjust investment profile of the account value based on evolution of the account with respect to the account's accumulation value and guarantee.

25. A non-transitory computer readable medium with processor instructions embodied thereon to cause a processing unit to:
- receive a first Target Value Date from an insured;
- receive information regarding initial investment by insured into an account;
- determine a guarantee, from an insurer to an insured, of a first Target Value at a first Target Value Date;
- wherein the first Target Value is:
  - based at least in part on an initial investment into a contract account where account holder is required to follow investment guidelines provided by the insurer, adjusted upward by the insurer if the contract account value exceeds the first Target Value at a predetermined date prior to the first Target Value Date, and
  - guaranteed to be greater than sum of investment payments into the contract account; and
- wherein periodically, at predetermined dates prior to the first Target Value Date, the contract account value is identified to be increased, by a credit to the contract account by the insurer, to match the first Target Value if the current contract account value is less than the first Target Value;
- receive a second Target Value for a selected future anniversary of the first Target Value Date, wherein the processing unit will only except the second Target Value once the first Target Value Date is reached, and the second Target Value is an amount guaranteed by the insurer to be greater than the greater of the first Target Value or the contract account value on the first Target Value Date; and
- output information required to provide the guarantee.

26. The non-transitory computer readable medium of claim system of claim 25 wherein the processor instructions pertaining to the act of the determining the guarantee by the processor comprise processor instructions for calculating the guarantee.

27. The non-transitory computer readable medium of claim system of claim 25 wherein the processor instructions pertaining to the act of the determining the guarantee by the processor comprise processor instructions for obtaining information about an existing guarantee.

28. A non-transitory computer readable medium with processor instructions embodied thereon to cause a processing unit to:
- receive a first Target Value Date from an insured;
- receive information regarding initial investment by insured into an account;
- calculate a guarantee, from insurer to insured, of Target Value, for the account, at the first Target Value Date wherein Target Value is:
  - based on an initial account value and its returns being invested for duration of the guarantee in broadly defined groups of allocation choices, the choices determined by the insurer, wherein the owner has complete freedom to distribute portions of account value to individual choices within the broadly defined groups,
  - adjusted upward by the insurer if the account value exceeds the Target Value at a predetermined date prior to the first Target Value Date, and
  - guaranteed to be greater than sum of investment payments into the account; and
- wherein periodically, at predetermined dates prior to the first Target Value Date, the account value identified to be increased, by a credit to the account by the insurer, to match the Target Value if the current contract account value is less than the Target Value;
- receive a second Target Value for a selected future anniversary of the first Target Value Date, wherein the computer system will only except the second Target Value once the first Target Value Date is reached, and the second Target Value is an amount guaranteed by the insurer to be greater than the greater of the first Target Value or the account value on the first Target Value Date; and
- output information required to provide the guarantee.

29. The non-transitory computer readable medium of claim system of claim 28 wherein the processor instructions further comprise processor instructions to automatically adjust investment profile of the account value based on evolution of the account with respect to the account's accumulation value and guarantee.

* * * * *